United States Patent
Hwang et al.

(10) Patent No.: US 10,068,199 B1
(45) Date of Patent: Sep. 4, 2018

(54) SYSTEM TO CATALOGUE TRACKING DATA

(71) Applicant: Palantir Technologies Inc., Palo Alto, CA (US)

(72) Inventors: Deborah Hwang, Arlington, VA (US); Daniel Lidor, Washington, DC (US); William Rhyne, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 24 days.

(21) Appl. No.: 15/269,685

(22) Filed: Sep. 19, 2016

Related U.S. Application Data

(60) Provisional application No. 62/336,096, filed on May 13, 2016.

(51) Int. Cl.
  *G06Q 10/08* (2012.01)
  *H04W 4/02* (2018.01)

(52) U.S. Cl.
  CPC ....... *G06Q 10/087* (2013.01); *G06Q 10/0833* (2013.01); *H04W 4/02* (2013.01)

(58) Field of Classification Search
  CPC .................................................. G06Q 40/10
  See application file for complete search history.

(56) References Cited

U.S. PATENT DOCUMENTS

| | | | |
|---|---|---|---|
| 5,515,488 A | 5/1996 | Hoppe et al. | |
| 6,430,305 B1 | 8/2002 | Decker | |
| 6,820,135 B1 | 11/2004 | Dingman et al. | |
| 6,978,419 B1 | 12/2005 | Kantrowitz | |
| 6,980,984 B1 | 12/2005 | Huffman et al. | |
| 7,168,039 B2 | 1/2007 | Bertram | |
| 7,461,077 B1 | 12/2008 | Greenwood et al. | |
| 7,617,232 B2 | 11/2009 | Gabbert et al. | |
| 7,756,843 B1 | 7/2010 | Palmer | |

(Continued)

FOREIGN PATENT DOCUMENTS

| | | |
|---|---|---|
| CN | 102546446 A | 7/2012 |
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Russell S Glass
(74) *Attorney, Agent, or Firm* — Schwegman Lundberg & Woessner, P.A.

(57) ABSTRACT

Aspects of the present disclosure involve a data audit system to generate and cause display of a tracking interface at a client device, wherein the tracking interface is configured to facilitate the visualization of tracking data retrieved from multiple sources. The audit system is configured to access a data source to retrieve tracking data that includes an associated asset identifier that identifies a subject of the tracking data, to link the retrieved tracking data to a data object at a database of the audit system based on the asset identifier, and to generate and cause display of a visualization of the tracking data within a tracking interface.

20 Claims, 10 Drawing Sheets

(56) References Cited

U.S. PATENT DOCUMENTS

| | | |
|---|---|---|
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D'Albora et al. |
| 2007/0185867 A1 | 8/2007 | Maga et al. |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0157732 A1 | 6/2009 | Hao et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218955 A1 | 9/2011 | Tang et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |

(56) References Cited

U.S. PATENT DOCUMENTS

| | | |
|---|---|---|
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0218879 A1 | 8/2013 | Park et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0060939 A1* | 3/2014 | Eppert ............... E02F 3/342 177/1 |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| EP | 2996053 A1 | 3/2016 |
| EP | 3035214 A1 | 6/2016 |
| EP | 3038002 A1 | 6/2016 |
| EP | 3040885 A1 | 7/2016 |
| WO | WO-2005116851 A2 | 12/2005 |
| WO | WO-2012061162 A1 | 5/2012 |

OTHER PUBLICATIONS

"About OWA", Open Web Analytics, [Online]. Retrieved from the Internet: <URL: http://www.openwebanalytics.com/?page jd=2, (Accessed: Jul. 19, 2013), 5 pgs.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"Application U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Examiner Interview Summary dated Apr. 22, 2016", 7 pgs.

"U.S. Appl. No. 14/225,160, Final Office Action dated Jan. 25, 2016", 25 pgs.

"U.S. Appl. No. 14/225,160, Final Office Action dated Feb. 11, 2015", 30 pgs.

"U.S. Appl. No. 14/225,160, First Action Interview Pre-Interview Communication dated Jul. 29, 2014", 19 pgs.

"U.S. Appl. No. 14/225,160, First Action Interview Pre-Interview Communication dated Oct. 22, 2014", 6 pgs.

"U.S. Appl. No. 14/225,160, Non Final Office Action dated Aug. 12, 2015", 23 pgs.

"U.S. Appl. No. 14/306,138, Examiner Interview Summary dated Dec. 3, 2015", 3 pgs.

"U.S. Appl. No. 14/306,138, Examiner Interview Summary dated Dec. 24, 2015", 5 pgs.

"U.S. Appl. No. 14/306,147, Final Office Action dated Dec. 24, 2015", 22 pgs.

"U.S. Appl. No. 14/319,161, Final Office Action dated Jan. 23, 2015", 21 pgs.

"U.S. Appl. No. 14/319,161, Notice of Allowance dated May 4, 2015", 6 pgs.

(56) References Cited

OTHER PUBLICATIONS

"U.S. Appl. No. 14/319,765, Non Final Office Action dated Feb. 1, 2016", 10 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview—Pre-Interview Communication dated Dec. 10, 2015", 6 pgs.
"U.S. Appl. No. 14/813,749, Final Office Action dated Apr. 8, 2016", 80 pgs.
"U.S. Appl. No. 14/813,749, Non Final Office Action dated Sep. 29, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"U.S. Appl. No. 15/071,064, First Action Interview Pre-Interview Communication dated Jun. 16, 2016", 11 pgs.
"Beta Testing on The Fly", TestFlight, [Online]. Retrieved from the Internet: <URL: https://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"Data Powered Mobile Advertising", Free Mobile App Analytics and various analytics related screen shots, (Jul. 18, 2013), 8 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Communication Pursuant to Article 94(3) EPC dated Feb. 18, 2016", 9 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated Mar. 30, 2016", 16 pgs.
"European Application Serial No. 15201924.6, Extended European Search Report dated Apr. 25, 2016", 8 pgs.
"European Application Serial No. 15202919.5, Extended European Search Report dated May 9, 2016", 13 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google. com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vase Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com!>, (Accessed: Jul. 18, 2013), 13 pgs.

(56) References Cited

OTHER PUBLICATIONS

"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia:, [Online] retrieved from the internet:https://en.wikipedia.org/w/index.php?title=Mobile Web &oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent.com/>, (Accessed: Jul. 18, 2013), 9 pgs.
"Multimap", Wikipedia, [Online]. Retrieved from the Internet: <URL: https://en.wikipedia.org/w/index.php?title=Multimap &oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"SAP BusinessObjects Explorer Online Help", SAP BusinessObjects, (Mar. 19, 2012), 68 pgs.
"Smart Thinking for Super Apps", [Online]. Retrieved from the Internet: <http://www.appacts.com>, (Jul. 18, 2013), 4 pgs.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 16 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical records: methodological guidelines", Journal of Epidemiology and Community Health 1993; 47, (Feb. 1993), 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4 & Chapter 10, (Sep. 2010), 38 pages.
Hua, Yu, et al., "A Multi-attribute Data Structure with Parallel Bloom Filters for Network Services", HiPC 2006, LNCS 4297, (2006), 277-288.
Jan-Keno, Janssen, "Wo bist'n du?—Googles Geodienst Latitude", Not in English, [Online] retrieved from the internet:http://www.heise.de/artikel-archiv/ct/2011/03/086/©00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Record Linkage Software and Methods for Merging Administrative Lists", Bureau of the Census Statistical Research Division: Statistical Research Report Series, No. RR2001/03, (Jul. 23, 2001), 11 pgs.

* cited by examiner

SYSTEM TO CATALOGUE TRACKING DATA

PRIORITY APPLICATION

This application claims priority to U.S. Provisional Application Ser. No. 62/336,096, filed May 13, 2016, the disclosure of which is incorporated herein in its entirety by reference.

TECHNICAL FIELD

The subject matter disclosed herein relates to tracking systems, and more particularly, to systems and methods for cataloguing and visualizing tracking data received from one or more distinct tracking systems.

BACKGROUND

In the present environment, there is a recognized need for improvements in tracking technologies. For example, the ability to track assets such as packages and shipping containers, as well as wildlife and vehicles becomes increasingly difficult as the number of tracked assets increases. This recognition has resulted in the desire for a diverse suite of tracking tools. While having a broad assortment of diverse tracking tools may prove to be advantageous, the sheer volume and diversity of tracking data retrieved from the tracking tools has become increasingly difficult to manage. As a result, erroneous and contradictory data points from diverse tools make visualization and management of tracking data problematic.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
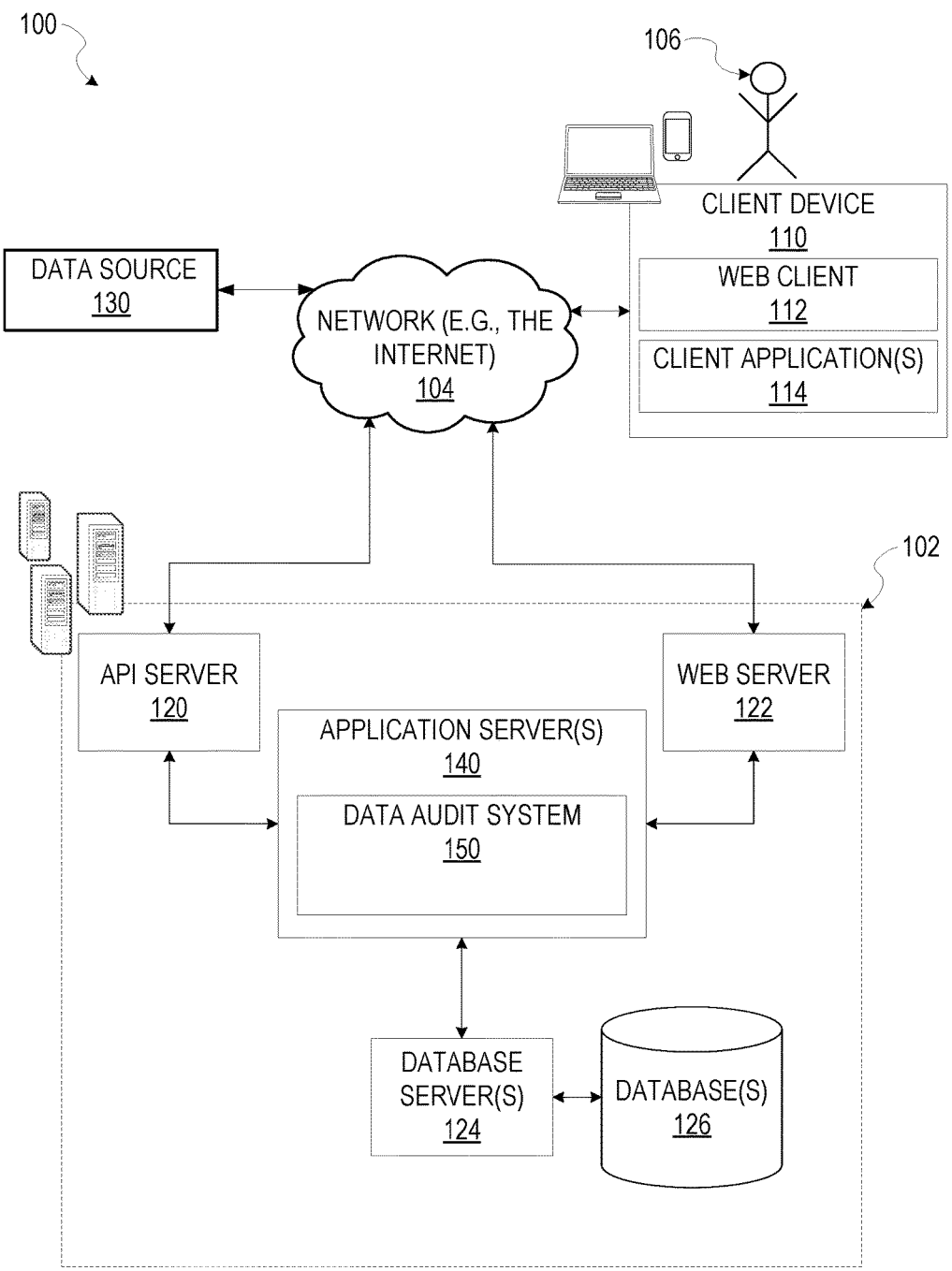
FIG. 1 is a network diagram depicting a network system comprising a group of application servers in communication with a network-based data audit system configured for generating and causing display of a visualization of tracking data, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Additional details regarding use cases can be found in U.S. patent application Ser. No. 15/082,307 entitled "INTERACTIVE MAP INTERFACE DEPICTING USER ACTIVITY," assigned to the assignee of the instant application, which application is hereby incorporated by reference in its entirety.

Example embodiments relate to a network-based data audit system, employed for accessing tracking data, presenting a visualization of the tracking data within a graphical user interface (GUI) at a client device, identifying patterns within the tracking data, and distinguishing anomalous data points within a presentation of the tracking data based on the patterns. "Tracking data," as used herein, may include data types ranging from static observation logs, cell phone data, vehicle tracking data, and beacon data, all of which may be collected and stored within a database. For example, static observation logs are composed of human-made observations on assets of interest from a static observation location. Static observation log data includes timestamps of the observations, as well as details pertaining to the asset observed. For example, the static observation logs may include customs manifests, and cargo logs. Beacon data is composed of data from beacon tracking devices associated with tracked assets. Beacon data captures timestamp data, as well as longitude and latitude of an asset at a given time.

The tracking data may therefore include data collected in real-time, as well as historical data stored within one or more databases. Tracking data includes geospatial coordinate information, as well as temporal data that indicates a time and date in which the data was gathered. In example embodiments, the tracking data is stored in network databases capable of being accessed by applications hosted by servers that share common access to the network databases. Anomalous data points include data points that are new and inconsistent and/or contradictory when compared to existing patterns within the tracking data.

Aspects of the present disclosure involve a data audit system to generate and cause display of a tracking interface at a client device. The tracking interface is configured to present tracking data retrieved from multiple sources. The audit system accesses a data source to retrieve tracking data that includes an associated asset identifier that identifies a subject of the tracking data (e.g., tracked assets such as: shipping container, devices, delivery vehicle, delivery person, event, or location), and links the retrieved tracking data to a data object at a database of the audit system based on the asset identifier. For example, the tracking data may comprise a single data point that includes a reference to a single entity (e.g., an identifier of a package, shipping container, person, vehicle, or device). The reference may include a filename, or other similar tag which may be designated by the data source, or in some example embodiments by the audit system itself. The audit system links the data point to a data object within a database based on the asset identifier.

In some example embodiments, the database comprises a set of data objects, and each data object within the set is associated with a unique asset identifier. In this way, tracking data accessed and retrieved by the audit system may be linked to corresponding data objects based on an asset identifier included within the tracking data.

The audit system is configured to receive a selection of one or more data objects from a user device, and in response to receiving the selection, generate and cause display of a tracking interface that includes a summarization of the tracking data linked to the data objects. The summarization may include graphical windows configured to display details of the tracking data linked to the selected data objects. For example, the graphical windows may include a presentation of an asset identifier, a data type of the tracking data, a date or time associated with the tracking data (e.g., last update, time of retrieval), and an indication of other asset identifiers indicated within the tracking data.

A user of the audit system may provide a selection of one or more of the graphical windows through appropriate interaction with the tracking interface (e.g., a mouse click), and in response, the audit system generates a visualization of the tracking data linked to the selected data objects. The audit system identifies a pattern associated with a subject (e.g., an individual, an asset, a device, a vehicle, etc.) identified by an asset identifier of the tracking data. For example, the pattern may indicate that a subject of the tracking data regularly visits particular locations at specific times of a day (e.g., based on vehicle tracker, beacon, and/or cell phone data), or conducts activity with other subject(s) at particular locations or specific times of day (e.g., based on cell phone data, network data and/or observational logs). The audit system assigns those patterns to the data objects associated with the asset identifier of the subjects, for example by linking a record of the pattern to the data object within a database.

The audit system identifies anomalous data points based on the identified patterns. The anomalous data points include data points that are new (e.g., never before seen), inconsistent (e.g., outside of regular patterns), and/or contradictory (e.g., contrary to existing data points). For example, a pattern associated with an asset identifier may include a set of data points indicating coordinates, and associates of the subject (e.g., based on references to asset identifiers). An anomalous data point may correspond to coordinates of a location that have previously not been visited by the subject (e.g., coordinates not present in previous tracking data associated with the asset identifier), and in some instances, a new associate of the subject (e.g., asset identifiers) who was not previously referenced within the tracking data of the subject. In response to identifying the anomalous data points, the audit system visually distinguishes the anomalous data points from the visualization of the tracking data (e.g., by distinct color or pattern).

The audit system may receive a request from a user to overlay tracking data upon a visualization generated by the audit system. For example, a user may select a first set of graphical windows representing data objects, and in response, the audit system generates a first visualization of the first set of tracking data linked to the selected data objects in a single visualization interface. To overlay a second visualization of a second set of tracking data, the user may provide a selection of a second set of graphical windows. In response, the audit system causes display of a second visualization of the second set of tracking data over the first visualization. In some example embodiments, the overlaid tracking data may be visually distinguished from the first set of tracking data (e.g., based on a predefined color or graphical element).

The audit system is configured to identify relationships between data objects based on the linked tracking data. For example, the linked tracking data of a first data object of a first asset identifier may include a reference to a second asset identifier. The audit system generates and presents a notification within the tracking interface indicating the relationship between the data objects. A user of the audit system may provide inputs to indicate relationships between data objects, and set alerts to provide notifications when tracking data from a first data source includes a reference to an indicated data object. For example, the user may provide input to indicate that a notification be displayed any time tracking data from a first data source includes any reference to a data object of a second data source.

FIG. 1 is a network diagram illustrating a network environment 100 suitable for operating a data audit system 150. A networked system 102 provides server-side functionality, via a network 104 (e.g., an intranet, the Internet or a Wide Area Network (WAN)), to one or more clients such as the client device 110, and data source 130. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the data audit system 150. The application servers 140 are, in turn, shown to be coupled to one or more database servers 124 that facilitate access to one or more databases 126.

The data audit system 150 facilitates the accessing of tracking data, presenting a visualization of the tracking data within a graphical user interface (GUI) at a client device, identifying patterns within the tracking data, and distinguishing anomalous data within the visualization of the tracking data based on the patterns. For example, the data audit system 150 is configured to access the data source(s) 130 to retrieve tracking data, link the tracking data to a database (e.g., database 126), and generate and cause display of a GUI at the client device 110, based on the retrieved tracking data. The data source(s) may be or include a database (e.g., similar to database 126).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the presentation platform 102.

Figure 2:
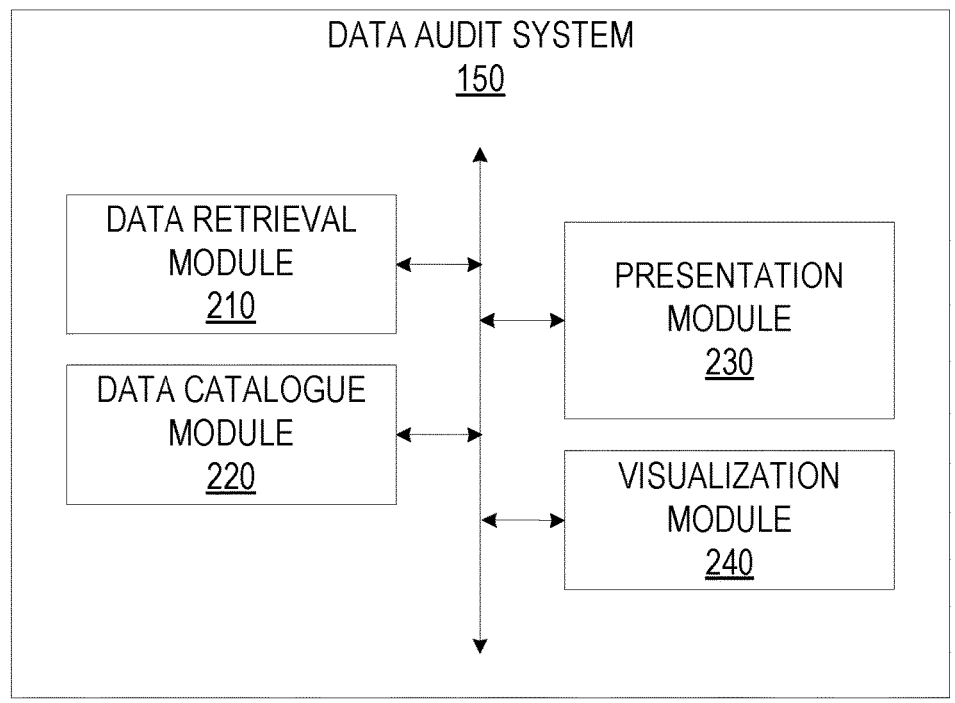
FIG. 2 is a block diagram illustrating various components of the data audit system, which is provided as part of the network system, consistent with some embodiments.

FIG. 2 is a block diagram illustrating an exemplary embodiment of the various components of the data audit system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the audit system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the audit system 150 may be combined into a single module, or subdivided among multiple modules. It shall be appreciated that while the functional components (e.g., modules) of FIG. 2 are discussed in the singular sense, in other embodiments, multiple instances of one or more of the modules may be employed.

The data audit system 150 is shown as including a data retrieval module 210, a data catalogue module 220, a presentation module 230, and a visualization module 240, all configured to communicate with each other (e.g., via a bus, shared memory, a switch, or application programming interfaces (APIs)).

The data retrieval module 210 facilitates the access and retrieval of tracking data from various data sources (e.g., data source 130). The data source 130 may include a database that includes real-time as well as historical tracking data. The tracking data comprises one or more data points that include an asset identifier indicating a subject (e.g., a tracked asset, device, person, location, or vehicle) of the tracking data. For example, the tracking data may include observational logs, graphical images and videos, location coordinates, and cell phone data (e.g., geolocation data, call duration, call recipient, caller identification, etc.). The data retrieval module 210 provides the retrieved tracking data to the data catalogue module 220.

The data catalogue module 220 receives the tracking data from the data retrieval module 210, and indexes the tracking data within the database 126. The data catalogue module 220 may catalogue the tracking data based on the data source itself, or in some instances, based on the associated asset identifier of the tracking data. Thus, as the data catalogue module 220 receives tracking data, the data catalogue module 220 links the received tracking data to a data object within the database 126. Data linking is a process by which to connect related data that was not previously linked. In this way, the tracking data may be associated with a data object located within the database 126, and referenced at a later time based on the linking.

In some example embodiments, in addition to linking the tracking data to a data object within the database 126, the data objects themselves may be linked to one another based on tracking data. For example, tracking data may include a reference to multiple data objects (e.g., asset identifiers). Based on these references, the data catalogue module 220 links the data objects themselves within the database 126.

The presentation module 230 generates and causes display of GUIs at the client device 110. The GUIs include a tracking interface configured to present details of tracking data linked to one or more data objects of the database 126. A user (e.g., user 106) of client device 110 may provide inputs selecting one or more data objects of the database 126 to display within the tracking interface. For example, the user 106 may select a desired data source (e.g., data source 130), or asset identifier, and based on the selection, the presentation module 230 selects and presents graphical windows associated with the selections.

The visualization module 240 is configured to receive a visualization request, and generate a visualization of the tracking data linked to the data objects of the database 126 in response to receiving the visualization request. The visualization of the tracking data may include a map image with graphical elements representative of the data points at locations within the map image corresponding to coordinates identified by the tracking data. In response to receiving a selection of a graphical element, the visualization module 240 causes display of a display menu within the GUI that includes a list of tracking data associated with the data object corresponding to the selected data point. The list may comprise identifiers of data points of the tracking data, with icons indicating a data type (e.g., cell phone data, network data, beacon data, observational log). In response to a user selection of a data point from among the list of data points within the window, the visualization module 240 displays a visualization corresponding to the selection. For example, the selected data point may comprise observational logs that include temporal data. The visualization module 240 generates a visualization based on the selection, and displays times and dates which the observation data was gathered. In some example embodiments, a user may additionally select a visualization type (e.g., graph, chart).

The visualization module 240 is configured to receive a visualization request that includes a selection of one or more data objects (e.g., based on a selection of graphical windows associated with the data objects). In response to receiving the visualization request, the visualization module 240 accesses the selected data objects and retrieves the linked tracking data to generate and cause display of the visualization. To generate the visualization of the one or more data objects, the visualization module 240 causes display of the tracking data of each data object within a single visualization interface.

In some example embodiments, the visualization module 240 identifies patterns within the tracking data associated with an asset identifier based on the visualization and statistical analysis techniques. The visualization module 240 may generate an indication of the pattern, for example, by highlighting data points of data points of the identified pattern, or by causing display of a pop-up window which indicates a repeat occurrence of a data point within the tracking data. The statistical analysis may include pattern recognition algorithms and techniques. The visualization module 240 identifies anomalous data points based on the visualization, and distinguishes the anomalous data points from the data points of the pattern.

Figure 3:
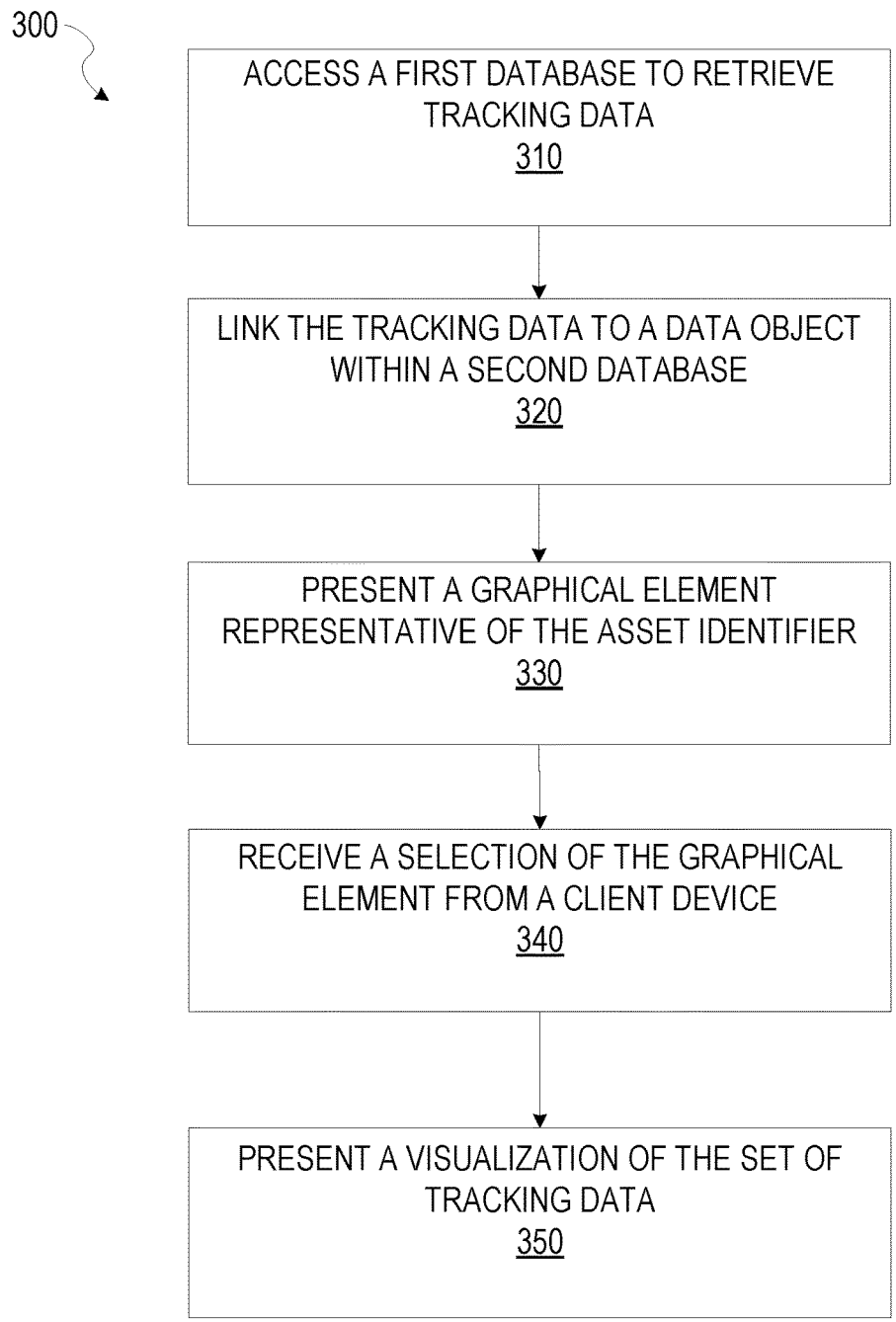
FIG. 3 is a flowchart illustrating a method for presenting a visualization of tracking data, according to some example embodiments.

FIG. 3 is a flow-chart illustrating a method 300 for generating and causing display of a visualization of tracking data within a GUI at a client device 110. The method 300 is embodied in computer-readable instructions for execution by one or more processors such that the operations of the method 300 are performed in part or in whole by the network-based data audit system 150; accordingly, the method 300 is described below by way of example with reference thereto. However, it shall be appreciated that at least some of the operations of the method 300 may be deployed on various other hardware configurations, and the method 300 is not intended to be limited to the network-based audit system 150.

At operation 310, the data retrieval module 210 accesses a data source (e.g., data source 130) to retrieve tracking data. The tracking data may include static observation logs, cell phone data, vehicle tracker data, and beacon data. The tracking data may be collected at intervals, in near real time, or from a database of the data source 130, similar to database 126. The tracking data includes an asset identifier indicating a person, event, or location associated with the tracking data.

At operation 320, the data catalogue module 220 links the retrieved tracking data to a data object within a database 126. In some example embodiments, the data catalogue module 220 links the tracking data to a data object associated with the data source (e.g., data source 130). In other example embodiments, the data catalogue module 220 links the tracking data to a data object associated with the asset identifier.

Figure 6:
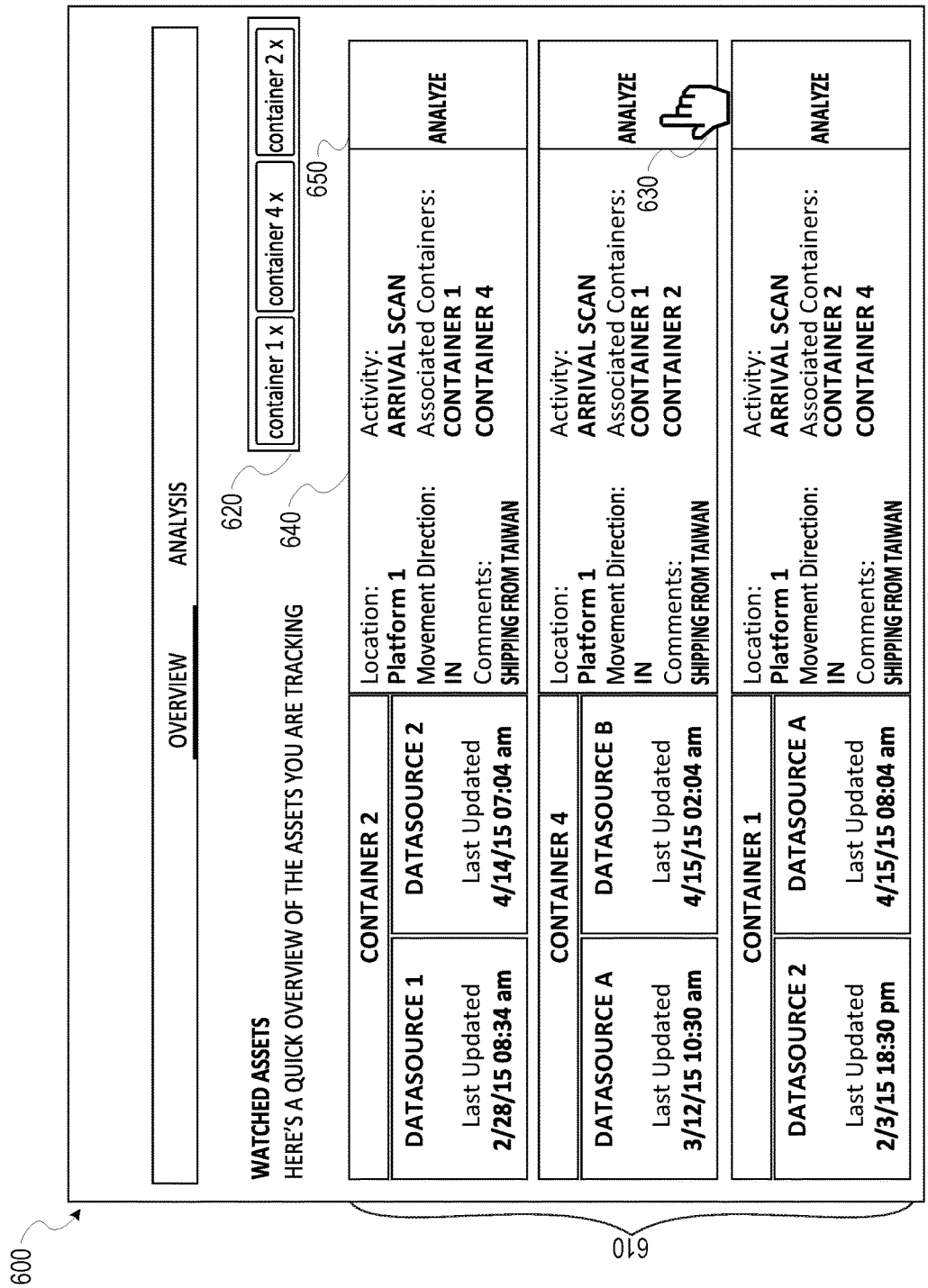
FIG. 6 is an interface diagram illustrating a portion of a graphical user interface depicting a visualization dashboard, consistent with some embodiments.

At operation 330, having linked the tracking data to the data object, the data catalogue module 220 causes display of a GUI at the client device 110. The GUI includes a tracking interface and one or more graphical windows representative of the tracking data linked to the data objects. The graphical windows may include, for example, an indication of the asset identifier of the data object, and a description of the tracking data linked to the data object (e.g., a time and date the tracking data was gathered, or user comments). In some example embodiments, the presentation module 230 is configured to receive a selection of one or more data objects, and in response, to cause display of graphical windows representative of the tracking data linked to the selected data objects. An example of the tracking interface is illustrated in FIG. 6 and discussed below, according to example embodiments.

At operation 340, the visualization module 240 receives a user selection of a graphical window displayed within the tracking interface, from a user 106 of the client device 110. In some instances, the user 106 may select more than one graphical windows, to compare the tracking data of the corresponding data objects associated with the graphical windows.

Figure 7:
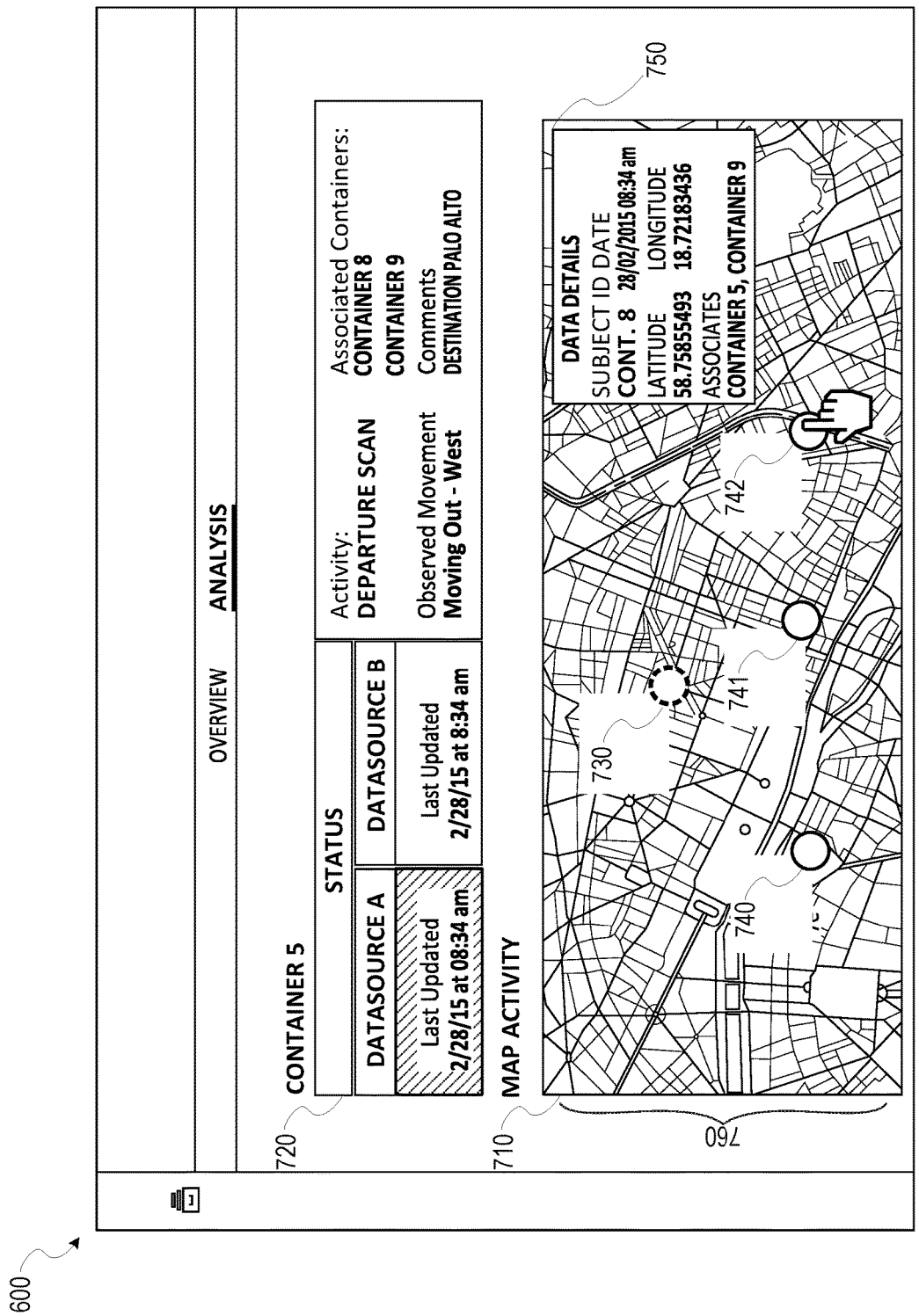
FIG. 7 is an interface diagram illustrating a portion of a graphical user interface depicting a visualization of tracking data, consistent with some embodiments.
Figure 8:
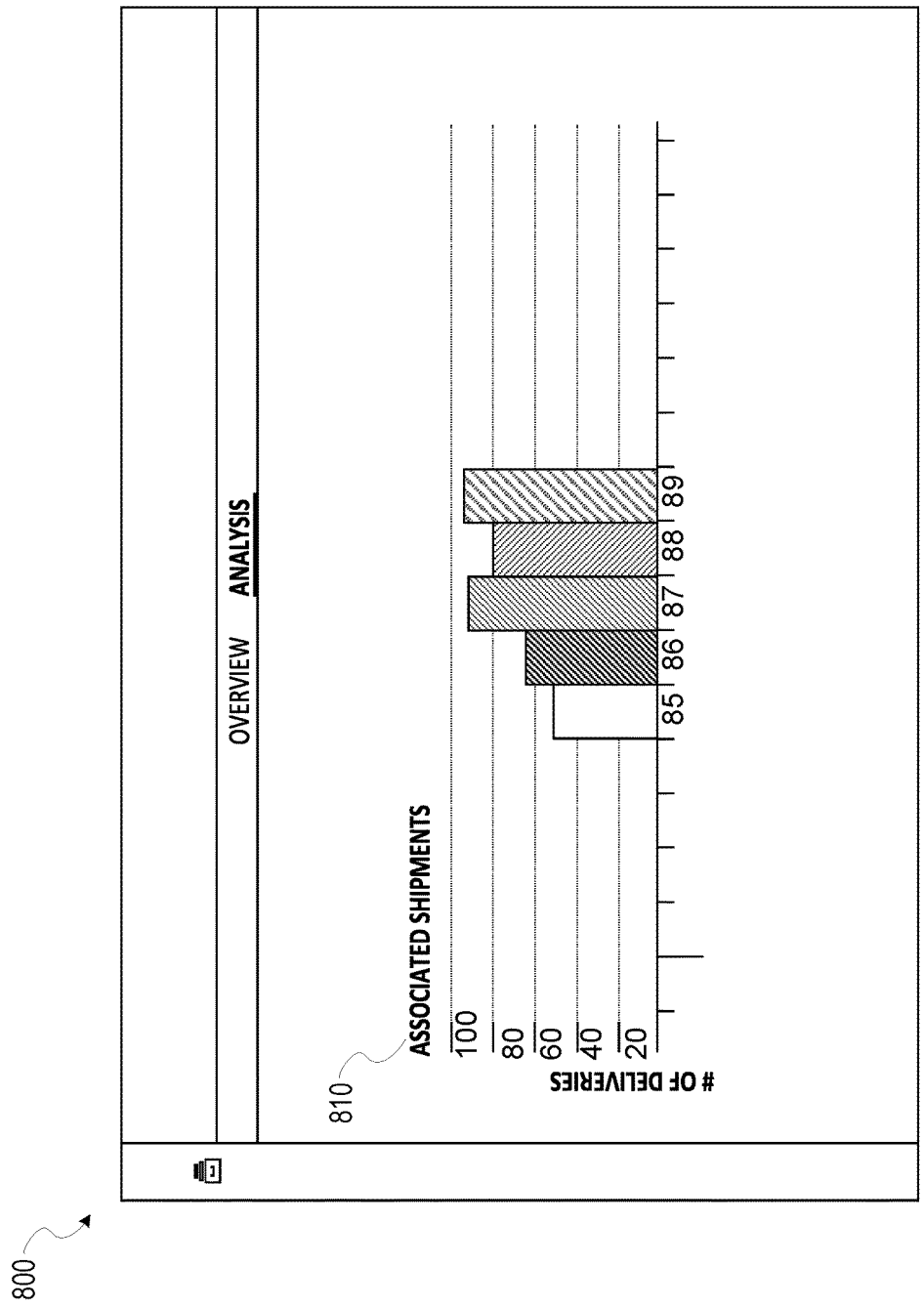
FIG. 8 is an interface diagram illustrating a portion of a graphical user interface depicting a visualization of tracking data, consistent with some embodiments.
Figure 9:
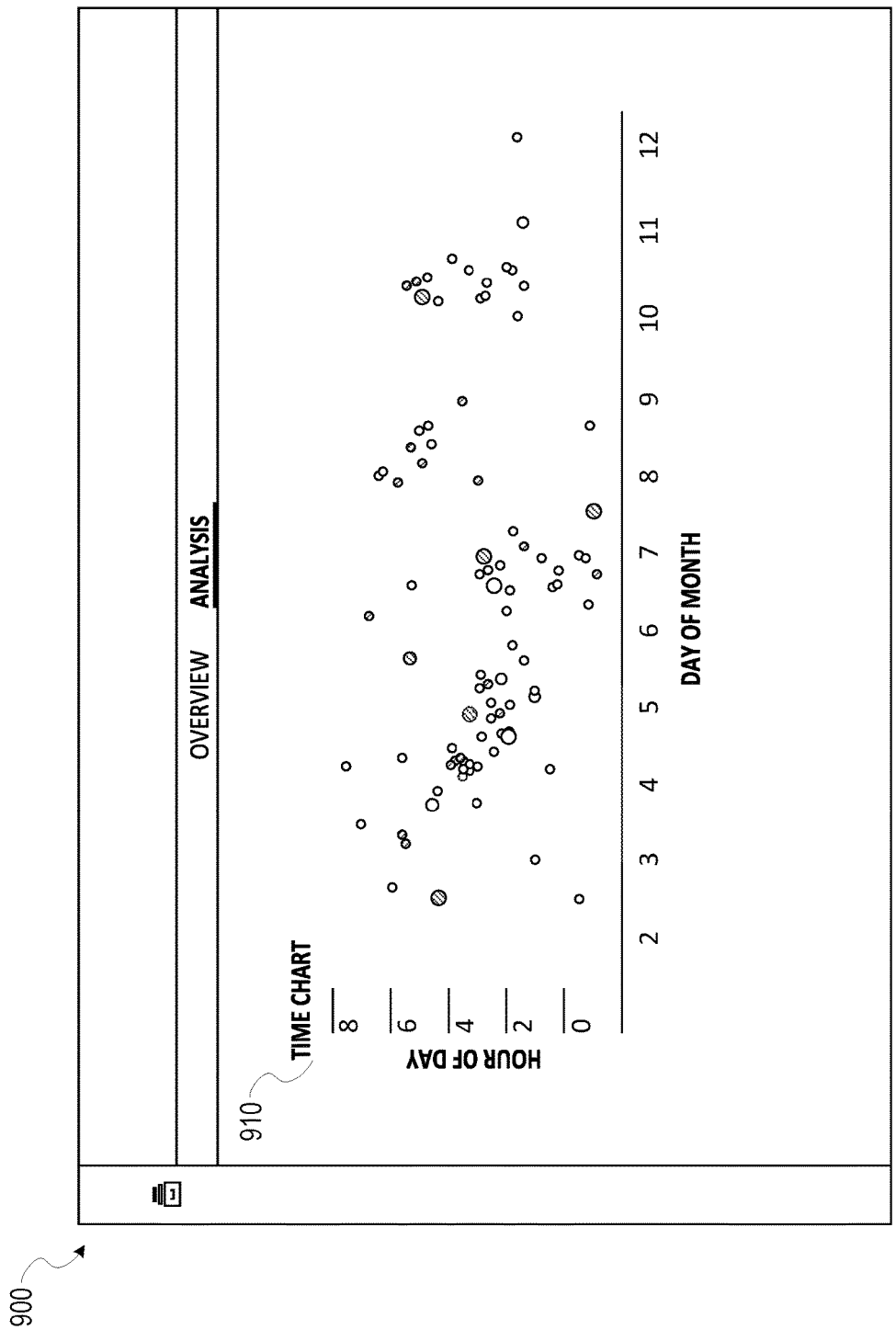
FIG. 9 is an interface diagram illustrating a portion of a graphical user interface depicting a visualization of tracking data, consistent with some embodiments.

At operation 350, in response to receiving the selection, the visualization module 240 generates and causes display of a visualization of the tracking data linked to the data objects of the selected graphical windows. An example of the visualizations generated by the visualization module 240 is illustrated in FIGS. 7-9 and discussed below, according to example embodiments.

Figure 4:
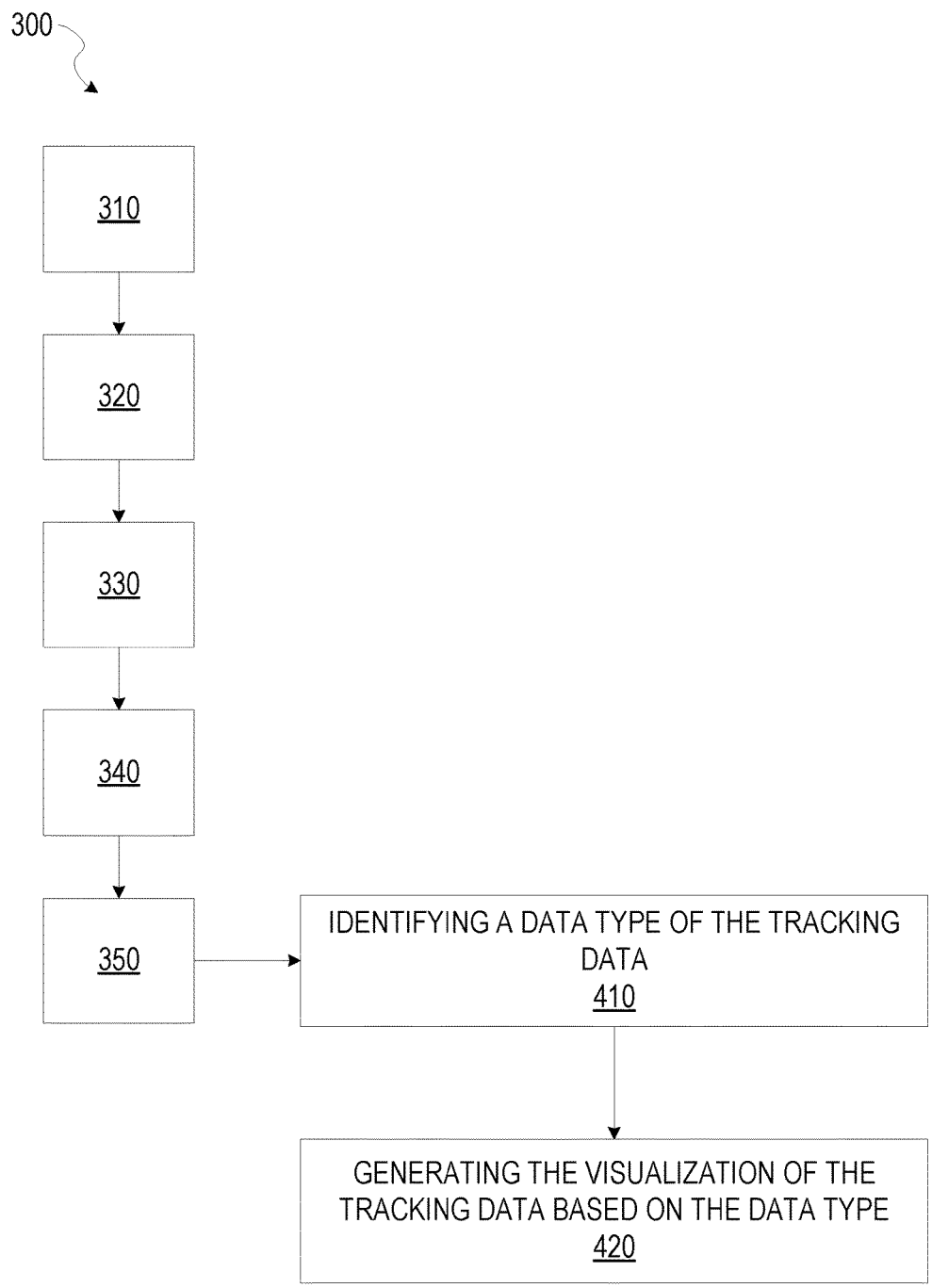
FIG. 4 is a flowchart, illustrating a method for presenting a visualization of tracking data, according to some example embodiments.

As shown in FIG. 4, one or more operations 410 and 420 may be performed as part (e.g., a precursor task, a subroutine, or a portion) of operation 350, in which the audit system 150 generates and causes display of a visualization of the tracking data linked to the data objects of the selected data points, according to some example embodiments.

At operation 410, in response to receiving the selection of the graphical window presented within the tracking interface, the visualization module 240 identifies a data type of the tracking data linked to the data object of the selected graphical window. For example, the data type of the tracking data may include any one of static observation logs, cell phone data, vehicle tracker data, network data or beacon data. The tracking data may additionally include geographic coordinates and temporal data.

At operation 420, the visualization module 240 generates and causes display of a visualization of the tracking data based on the data type. For example, each data type may have a corresponding visualization type (e.g., graph, chart, map, time chart). In some example embodiments, the visualization type may be defined based on user input. Having identified the data type of the tracking data, the visualization module 240 selects a visualization type based on the identified data type, and generates and causes display of a visualization.

Figure 5:
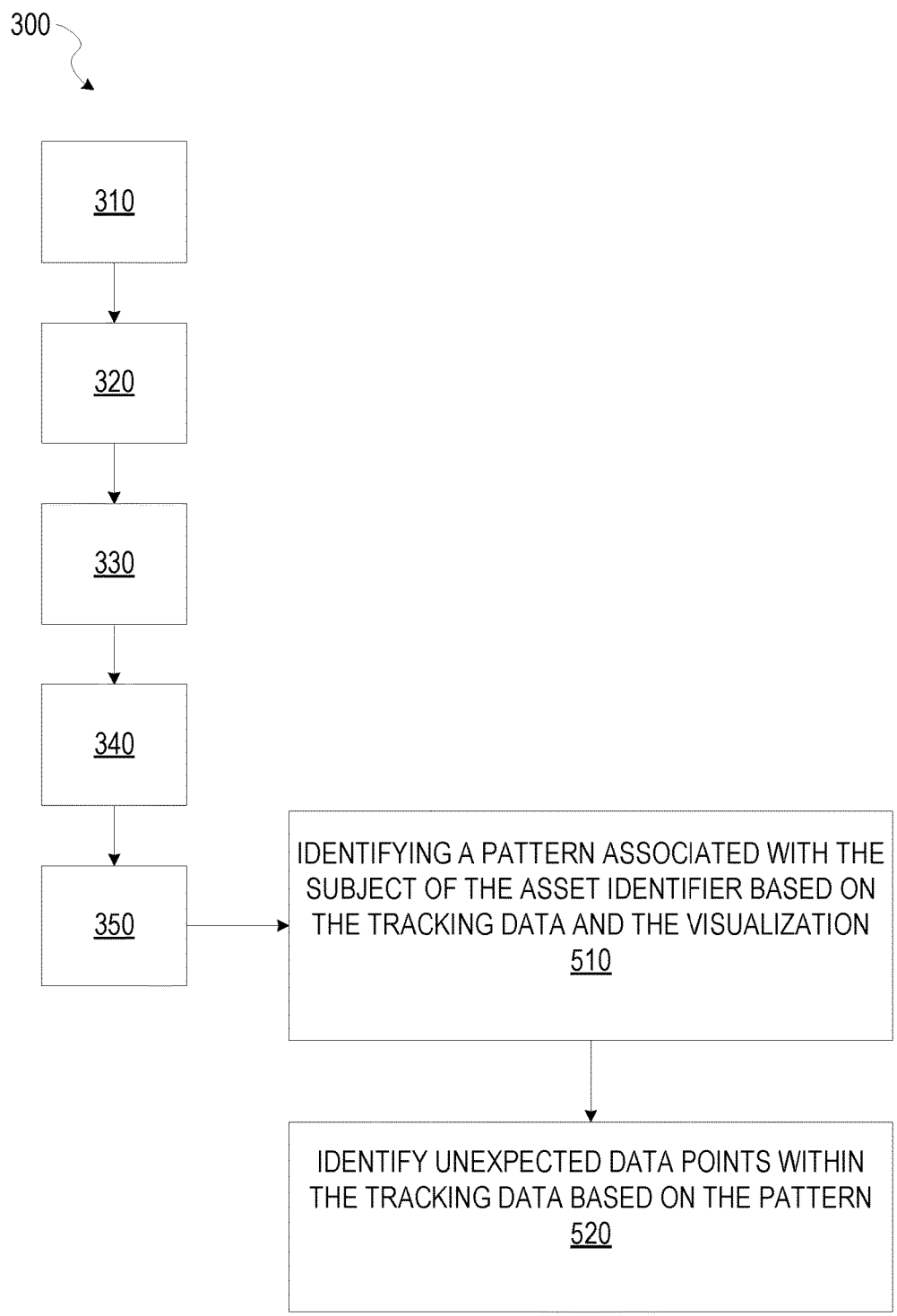
FIG. 5 is a flowchart, illustrating a method for identifying anomalous data points, consistent with some embodiments.

As shown in FIG. 5, one or more operations 510 and 520 may be performed as part (e.g., a precursor task, a subroutine, or a portion) of operation 350, in which the audit system 150 generates and causes display of a visualization of the tracking data linked to the data objects of the selected data points, according to some example embodiments.

At operation 510, the visualization module 240 identifies a pattern associated with the subject identified with the asset identifier corresponding to the tracking data of the visualization. For example, the pattern may be defined by an algorithm that calculates a frequency (e.g., a count) of a specific type of data point against a temporal measurement (e.g., day of week, hour of day, etc.). These are displayed as visualizations such as timelines, time-charts, heat-grids, as well as heat-maps. The pattern may include one or more data points that indicate repeat behavior of the subject. The repeat behavior may include being at a particular location based on coordinates at specific times or dates, conducting activity with the same associate(s) at specific times or dates, and from specific locations, as well as directions of travel, and even periods of inactivity based on the tracking data. Having identified the pattern, the visualization module 240 links the pattern to the asset identifier within the database 126.

At operation 520, the visualization module 240 analyses the tracking data and the visualization generated based on statistical analysis techniques, and in some example embodiments, identifies anomalous data points. Anomalous data points include: data points that reference new coordinates and activities previously unseen in the tracking data associated with the asset identifier; inconsistent data points that include tracking data indicating activity outside of the identified patterns; and contradictory data points that include tracking data contrary to existing data points.

Having identified the anomalous data points, the visualization module 240 visually distinguishes the anomalous data points from the tracking data. For example, the visualization module 240 may cause display of the anomalous data points in a distinct color or pattern. In some example embodiments, the visualization module 240 may additionally cause a graphical window that includes an indicator of a data source of the anomalous data point to be displayed in a predefined color or pattern to indicate that the data point from the data source include anomalous data points.

FIG. 6 is an interface diagram illustrating a GUI configured to display a tracking interface 600, for displaying graphical windows representative of tracking data accessed and retrieved by the audit system 150, according to some example embodiments. As shown, the tracking interface 600 includes a set of graphical windows 610, asset identifiers 620, a cursor 630, and tracking data information 640.

The tracking interface 600 may be presented by the presentation module 230 according to methodologies discussed in reference to FIG. 3. As shown in FIG. 6, the graphical windows 610 include an indication of a data source of the tracking data, an asset identifier of the tracking data, a date or time in which the tracking data corresponding to the asset identifier was last updated, and tracking data information 640. The tracking data information 640 may include details surrounding the linked tracking data. For example, as seen in FIG. 6, tracking data information 640 includes a display of a location corresponding to the tracking data, a type of activity documented by the tracking data, associates identified within the tracking data, and a direction of travel from the location (e.g., arrival, departure, southbound, etc.).

As shown in FIG. 6, the tracking interface 600 includes an analysis icon 650. The analysis icon 650 is configured to receive a user input (e.g., via a selection of the analysis icon 650 by the cursor 630), and in response to receiving the user input, causing the visualization module 240 to provide display of a visualization of the tracking data associated with the graphical window of the corresponding analysis icon 650.

In some instances, a user 106 of the client device 110 may opt to add or remove a graphical window from among the set of graphical windows 610 by selecting (or deselecting) a corresponding asset identifier 620. For example, the user 106 may remove a graphical window by providing a user input to delete an asset identifier from among the set of asset identifier 620 (e.g., selecting an "X" on the asset identifier). Alternatively, to add a graphical window to the tracking interface, the user 106 may provide a user input to add an asset identifier (e.g., selecting the "ADD" icon).

FIG. 7 is an interface diagram illustrating a visualization 710 of tracking data linked to a graphical window 720 within the tracking interface 600, according to the methodologies described in FIGS. 3-5. As shown in FIG. 6, the tracking interface 600 includes a graphical window 720, which was selected from among the set of graphical windows 610 of FIG. 6, and a visualization 710 of the tracking data linked to the data object corresponding to the graphical window 720. For example, a user 106 of a client device 110 may select the graphical window 650 with the cursor 630 of FIG. 6, and in response, the visualization module 240 generates and causes display of the visualization 720 and 710.

As shown in FIG. 7, the visualization 710 generated by the visualization module 240 includes a map image 760 and a set of data points (e.g., data point 730, data point 740) at locations on the map image 760 based on the linked tracking data. The location depicted by the map image 760 is selected by the visualization module 240 based on location data within the linked tracking data (e.g., coordinates in cell phone data, beacon data, and vehicle tracker data). For example, the visualization module 240 may identify coordinates from within the tracking data, and based on those coordinates retrieve a map image (e.g., map image 760) to present the tracking data. The visualization 710 also includes a display of data details 750 that presents additional information about the tracking data displayed. For example, the data details 750 may include a presentation of coordinates, an asset identifier, associated assets identified within the tracking data (e.g., other asset identifiers referenced by the tracking data) and a date corresponding to the tracking data of the visualization 710 (e.g., a date the tracking data was gathered).

In some example embodiments, the visualization generated by the visualization module 240 conveys new or inconsistent data points within the tracking data based on colors and patterns. For example, the visualization 710 includes data points 740-742. Data points 740-742 are displayed in a matching color or pattern, to indicate that the data points are a part of a pattern associated with the asset identifier identified within the graphical window 720 (e.g., Container 5). Data point 730 represents an anomalous data point. The visualization module 240 causes display of data point 730 in a predefined color or pattern to indicate that data point 730 is an anomalous data point. The visualization module 240 may additionally cause an indication of the data source associated with the anomalous data pint 730 to be displayed in a predefined color or pattern (e.g., Datasource A). In some example embodiments, the data points 740-742 may be displayed in predefined colors or patterns to indicate an age based on a corresponding timestamp. For example, new data points may be displayed as the color green, while older data points may be displayed in shades of red. In some example embodiments, the color or pattern of any one data point among the data points 740-742 may vary relative to the corresponding timestamps. For example, a new data point may be the color white, and subsequent, older data points may be displayed in progressively darker shades of gray until ultimately reaching the final data point in the time series that may be displayed in the color black.

FIG. 8 is an interface diagram illustrating a visualization 800 of a set of data points linked to an asset identifier, according to some example embodiments. As shown in FIG. 8, the visualization 800 includes a graph 810. The graph 810 illustrates the number of observations of a subject identified by the asset identifier at locations (e.g., delivery locations) based on tracked shipments referenced within the tracking data linked to the data object of the asset identifier (e.g., based on the appearance of the asset identifier of a tracked package).

FIG. 9 is an interface diagram illustrating a visualization 900 of a set of data points representative of a tracked asset, linked to an asset identifier, according to example embodiments. For example, the tracked asset may include a delivery vehicle, or shipping container. As shown in FIG. 9, the visualization 900 includes a presentation of a time chart 910 configured to display data points based on temporal data. For example, the time chart 910 of FIG. 9 illustrates a concentration of data points received based on the hour and day that the data point was received (e.g., arrival at a delivery). The visualization 900 conveys a snapshot of when the set of data points has the highest/lowest volume of activity.

Figure 10:
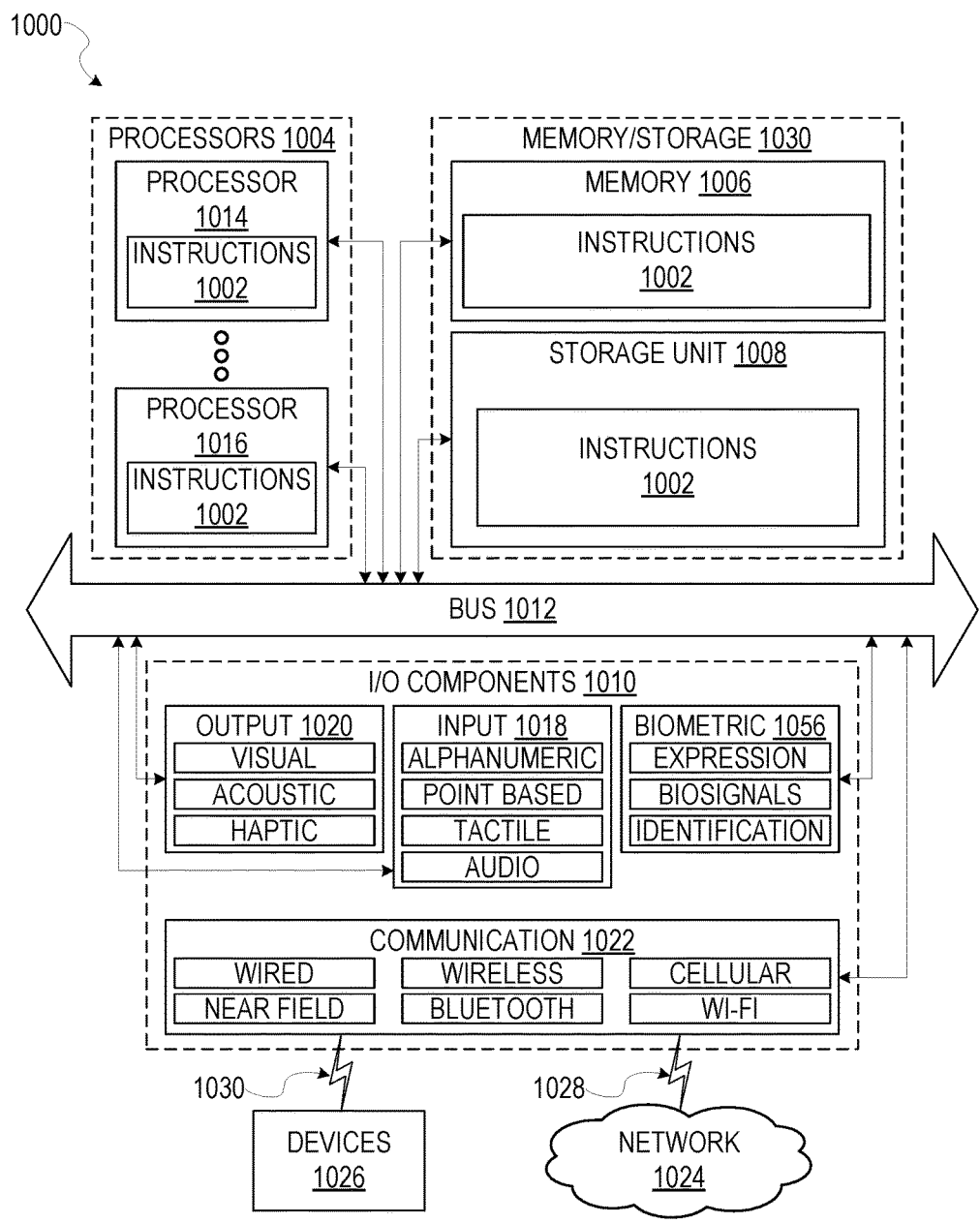
FIG. 10 is a diagrammatic representation of a machine in the example form of a computer system within which a set of instructions for causing the machine to perform any one or more of the methodologies discussed herein may be executed.

FIG. 10 is a diagrammatic representation of a machine in the example form of a computer system within which a set of instructions for causing the machine to perform any one or more of the methodologies discussed herein may be executed. Specifically, FIG. 10 shows a diagrammatic representation of the machine 1000 in the example form of a system, within which instructions 1002 (e.g., software, a program, an application, an applet, an app, a driver, or other executable code) for causing the machine 1000 to perform any one or more of the methodologies discussed herein may be executed. For example, the instructions 1002 include executable code that causes the machine 1000 to execute the methods 400 and 500. In this way, these instructions 1002 transform the general, non-programmed machine into a particular machine programmed to carry out the described and illustrated functions in the manner described herein. The machine 1000 may operate as a standalone device or may be coupled (e.g., networked) to other machines.

By way of non-limiting example, the machine 1000 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1002, sequentially or otherwise, that specify actions to be taken by machine 1000. Further, while only a single machine 1000 is illustrated, the term "machine" shall also be taken to include a collection of machines 1000 that individually or jointly execute the instructions 1002 to perform any one or more of the methodologies discussed herein.

The machine 1000 may include processors 1004, memory 1006, storage unit 1008 and I/O components 1010, which may be configured to communicate with each other such as via a bus 1012. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1014 and processor 1016 that may execute instructions 1002. The term "processor" is intended to include multi-core processors that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1006 (e.g., a main memory or other memory storage) and the storage unit 1008 are both accessible to the processors 1004 such as via the bus 1012. The memory 1006 and the storage unit 1008 store the instructions 1002 embodying any one or more of the methodologies or functions described herein. In some embodiments, the databases 126 resides on the storage unit 1008. The instructions 1002 may also reside, completely or partially, within the memory 1006, within the storage unit 1008, within at least one of the processors 1004 (e.g., within the processor's cache memory), or any suitable combination thereof, during execution thereof by the machine 1000. Accordingly, the memory 1006, the storage unit 1008, and the memory of processors 1004 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions (e.g., instructions 1002) for execution by a machine (e.g., machine 1000), such that the instructions, when executed by one or more processors of the machine 1000 (e.g., processors 1004), cause the machine 1000 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1010 may include a wide variety of components to receive input, provide output, produce output, transmit information, exchange information, capture measurements, and so on. The specific I/O components 1010 that are included in a particular machine will depend on the type of machine. For example, portable machines such as mobile phones will likely include a touch input device or other such input mechanisms, while a headless server machine will likely not include such a touch input device. It will be appreciated that the I/O components 1010 may include many other components that are not specifically shown in FIG. 10. The I/O components 1010 are grouped according to functionality merely for simplifying the following discussion and the grouping is in no way limiting. In various example embodiments, the I/O components 1010 may include input components 1018 and output components 1020. The input components 1018 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1010 may include communication components 1022 operable to couple the machine 1000 to a network 1024 or devices 1026 via coupling 1028 and coupling 1030, respectively. For example, the communication components 1022 may include a network interface component or other suitable device to interface with the network 1024. In further examples, communication components 1022 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1026 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors of a machine; and
   a memory storing instructions that, when executed by at least one processor among the one or more processors, causes the machine to perform operations comprising:
   accessing a first database to retrieve tracking data that describes geographic locations of an asset, the tracking data including an asset identifier;
   storing, in a second database, the tracking data as part of a data object identified by the asset identifier;
   causing display of a tracking user interface displaying a plurality of graphical windows describing tracked data objects including the data object identified by the asset identifier;
   receiving, from a client device, a selection of a graphical window from the plurality of graphical windows, the selected graphical window corresponding to the data object identified by the asset identifier;
   determining a pattern within the tracking data associated with the asset identifier, the pattern including a set of data points;
   identifying an anomalous data point based on the determined pattern; and
   causing display, within the tracking user interface, of a visualization of the tracking data identified by the asset identifier, the anomalous data point being visually distinguished from the remaining set of tracking data in the visualization.

2. The system of claim 1, wherein the operations further comprise:
   identifying a data type of the tracking data; and
   wherein the visualization is based on the data type identified.

3. The system of claim 1, wherein the tracking data includes a temporal attribute, and displaying the visualization includes:
   accessing the data object mapped to the asset identifier to retrieve the tracking data; and
   causing display of the tracking data at a location within a time chart, the location based on the temporal attribute.

4. The system of claim 1, wherein the anomalous data point is visually distinguished from the remaining set of tracking data in the visualization using at least one of: different colors, different graphical elements.

5. The system of claim 1, wherein the data object is a first data object, the asset identifier is a first asset identifier, the tracking data is a first tracking data, and the tracking data includes a reference to a second asset identifier, and the operations further comprise:
   accessing the second database to retrieve second tracking data mapped to a second data object associated with the second asset identifier stored within the second database; and
   wherein displaying the visualization includes overlaying the first tracking data on the second tracking data.

6. The system of claim 1, wherein the geographic locations include a geospatial attribute, and displaying the visualization includes:
   causing display of a map image; and
   presenting the tracking data as a graphical icon at a location within the map image, the location corresponding to the geospatial attribute.

7. The system of claim 6, wherein visualization is a first visualization, and the operations further comprise:
   receiving a selection of the graphical icon from a client device;
   accessing the second database to retrieve the tracking data;
   causing display of a display window at a location within the map image; and
   presenting a second visualization of the tracking data within the display window.

8. A method comprising:
   accessing a first database to retrieve tracking data that describes geographic locations of an asset, the tracking data including an asset identifier;
   storing, in a second database, the tracking data as part of a data object identified by the asset identifier;
   causing display of a tracking user interface displaying a plurality of graphical windows describing tracked data objects including the data object identified by the asset identifier;
   receiving, from a client device, a selection of a graphical window from the plurality of graphical window s, the selected graphical window corresponding to the data object identified by the asset identifier;
   determining a pattern within the tracking data associated with the asset identifier, the pattern including a set of data points;
   identifying an anomalous data point based on the determined pattern; and
   causing display, within the tracking user interface, of a visualization of the tracking data identified by the asset identifier, the anomalous data point is visually distinguished from the remaining set of tracking data in the visualization.

9. The method of claim 8, further comprising:
   identifying a data type of the tracking data; and
   wherein the visualization is based on the data type identified.

10. The method of claim 8, wherein the tracking data includes a temporal attribute; the method further comprising:
   accessing the data object mapped to the asset identifier to retrieve the tracking data; and
   causing display of the tracking data at a location within a time chart, the location based on the temporal attribute.

11. The method of claim 8, wherein the anomalous data point is visually distinguished from the remaining set of tracking data in the visualization using at least one of: different colors, different graphical elements.

12. The method of claim 8, wherein the data object is a first data object, the asset identifier is a first asset identifier, the tracking data is a first tracking data, and the tracking data includes a reference to a second asset identifier, and the method further includes:
   accessing the second database to retrieve second tracking data mapped to a second data object associated to the second asset identifier within the second database; and
   wherein displaying the visualization includes overlaying the first tracking data on the second tracking data.

13. The method of claim 8, wherein the geographic locations include a geospatial attribute, wherein the method further includes:
   causing display of a map image; and
   presenting the tracking data as a graphical icon at a location within the map image, the location corresponding to the geospatial attribute.

14. The method of claim 13, wherein the visualization is a first visualization, and the method further includes:
   receiving a selection of the graphical icon from a client device;
   accessing the second database to retrieve the tracking data;
   causing display of a display window at a location within the map image; and
   presenting a second visualization of the tracking data within the display window.

15. A machine readable storage device comprising instructions that, when executed by one or more processors of a machine, cause the machine to perform operations comprising:
   accessing a first database to retrieve tracking data that describes geographic locations of an asset, the tracking data including an asset identifier;
   storing, in a second database, the tracking data as part of a data object identified by the asset identifier;
   causing display of a tracking user interface displaying a plurality of graphical windows describing tracked data objects including the data object identified by the asset identifier;
   receiving, from a client device, a selection of a graphical window from the plurality of graphical windows, the selected graphical window corresponding to the data object identified by the asset identifier;
   determining a pattern within the tracking data associated with the asset identifier, the pattern including a set of data points;
   identifying an anomalous data point based on the determined pattern; and
   causing display, within the tracking user interface, of a visualization of the tracking data identified by the asset identifier, the anomalous data point is visually distinguished from the remaining set of tracking data in the visualization.

16. The machine readable storage device of claim 15, wherein the operations further comprise:
   identifying a data type of the tracking data; and
   wherein the visualization is based on the data type identified.

17. The machine readable storage device of claim 15, wherein the tracking data includes a temporal attribute; and wherein displaying the visualization includes:
   accessing the data object mapped to the asset identifier to retrieve the tracking data; and
   causing display of the tracking data at a location within a time chart, the location based on the temporal attribute.

18. The machine readable storage device of claim 15, wherein the anomalous data point is visually distinguished from the remaining set of tracking data in the visualization using at least one of: different colors, different graphical elements.

19. The machine readable storage device of claim 15, wherein the data object is a first data object, the asset identifier is a first asset identifier, the tracking data is a first tracking data, and the tracking data includes a reference to a second asset identifier, and the operations further comprise:

accessing the second database to retrieve second tracking data mapped to a second data object associated to the second asset identifier within the second database; and wherein displaying the visualization includes overlaying the first tracking data on the second tracking data.

20. The machine readable storage device of claim 15, wherein the geographic locations include a geospatial attribute, and the operations for presenting the visualization includes:

causing display of a map image; and presenting the tracking data as a graphical icon at a location within the map image, the location corresponding to the geospatial attribute.

\* \* \* \* \*